(No Model.) 3 Sheets—Sheet 1.
A. M. A. FOURNET.
OPTOMETER.
No. 343,899. Patented June 15, 1886.
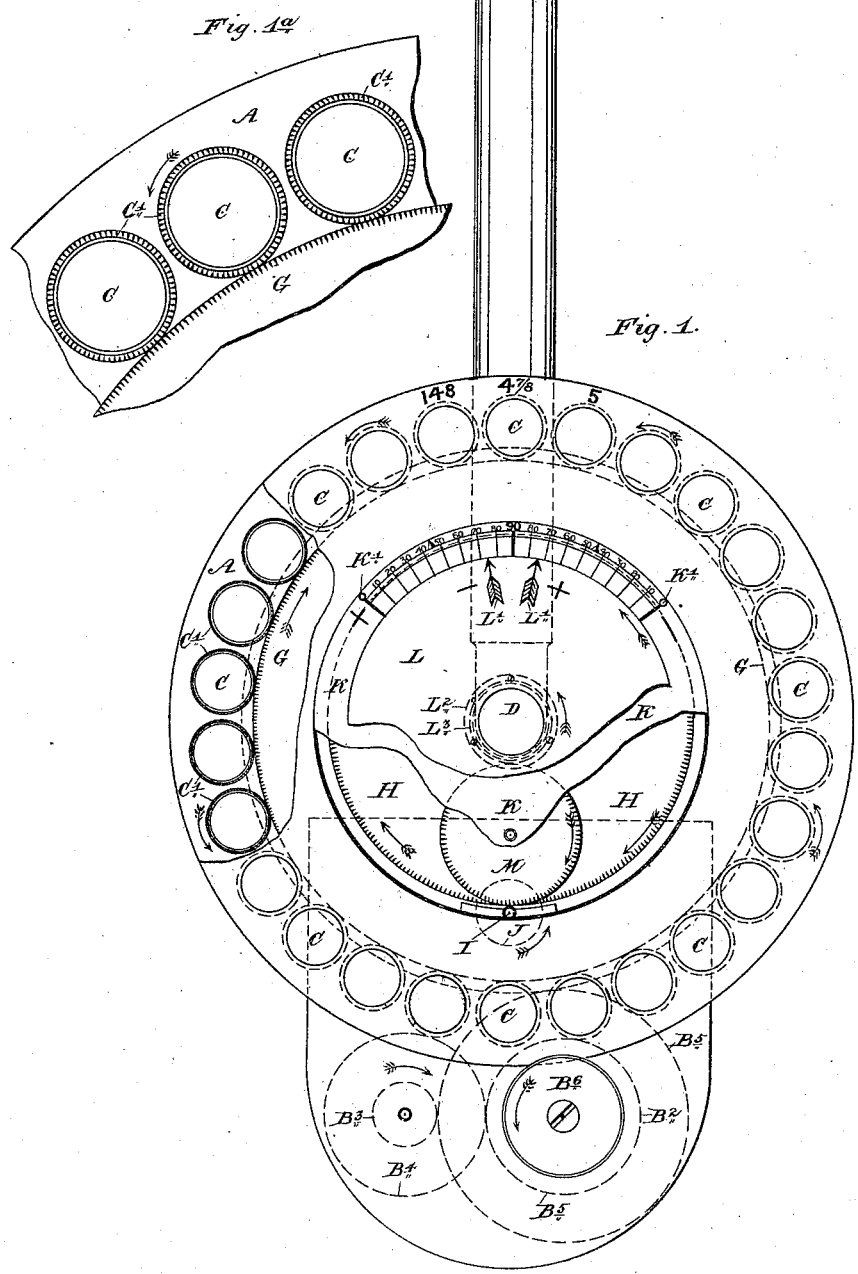
Witnesses:
Harry S. Rohrer
Chas M. Werle
Inventor
A. M. A. Fournet
Per Duffy & Brashears
Attorneys (No Model.) 3 Sheets—Sheet 2.
A. M. A. FOURNET.
OPTOMETER.
No. 343,899. Patented June 15, 1886.
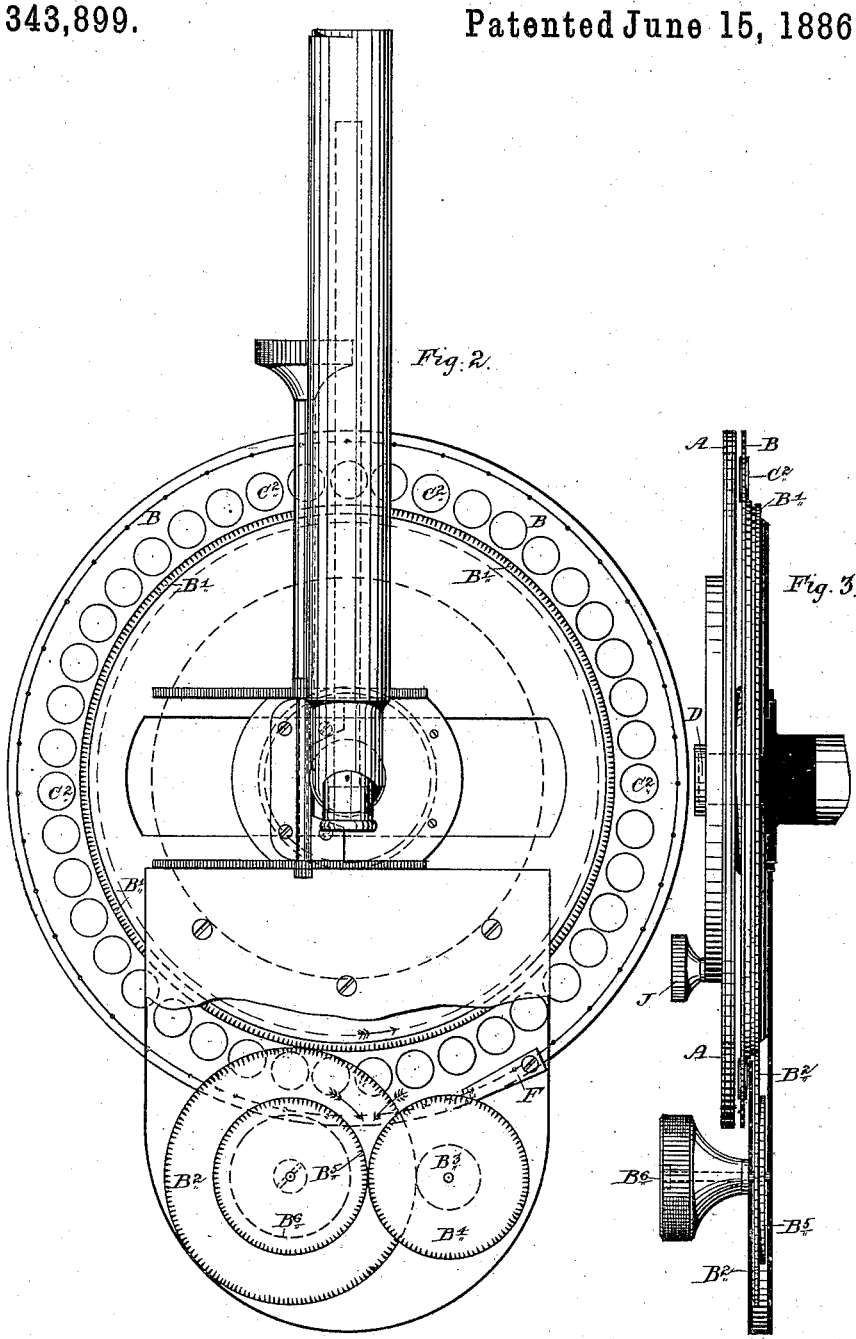

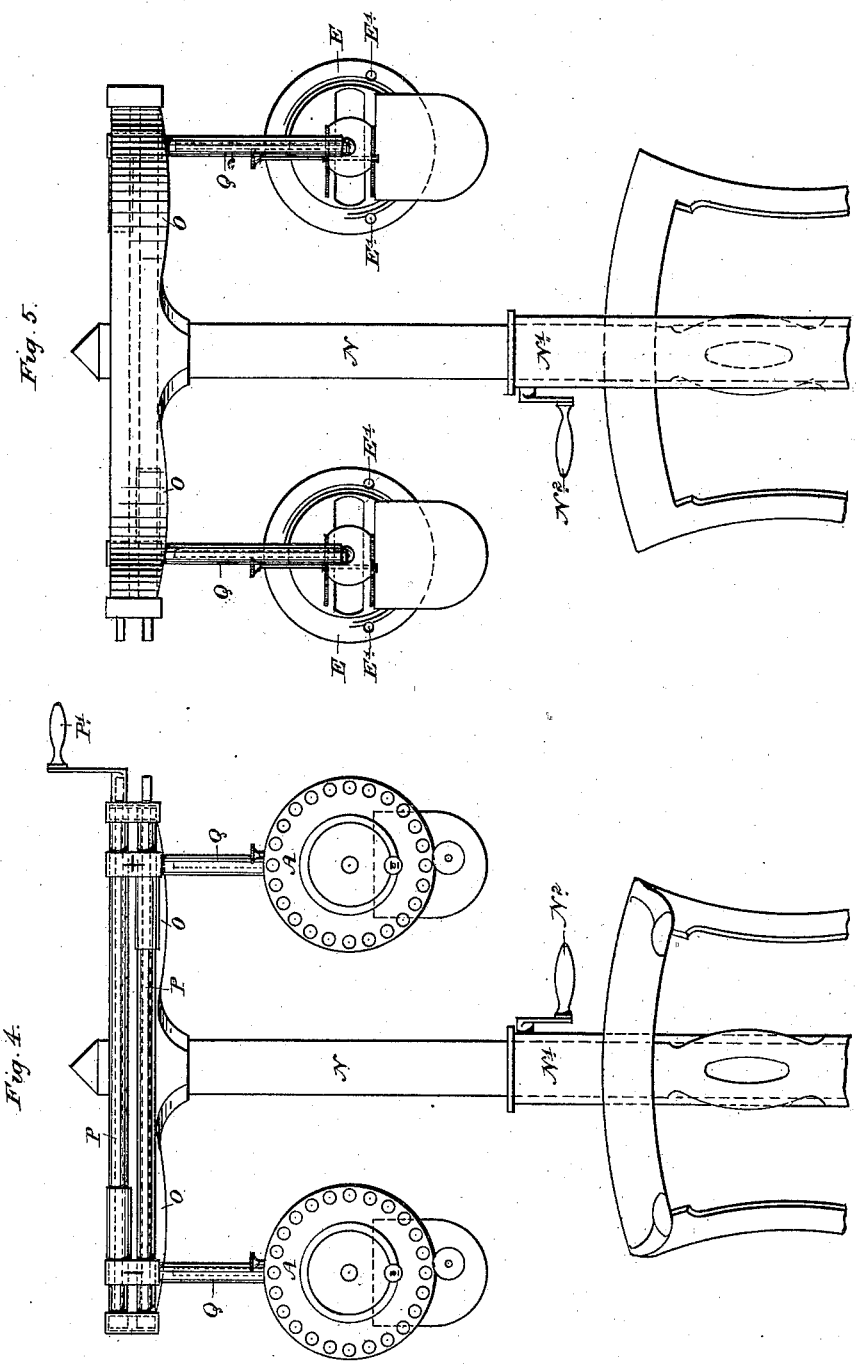

UNITED STATES PATENT OFFICE.

ARISTIDE MARIE ANTOINE FOURNET, OF LONDON, ENGLAND.

OPTOMETER.

SPECIFICATION forming part of Letters Patent No. 343,899, dated June 15, 1886.

Application filed October 14, 1885. Serial No. 179,817. (No model.)

*To all whom it may concern:*

Be it known that I, ARISTIDE MARIE ANTOINE FOURNET, a citizen of the Republic of France, residing at London, England, have invented new and useful Improvements in Instruments for Determining the Refractive Errors of the Eye, of which the following is a specification.

In the accompanying drawings, Figure 1 is a front view (operator's side) of one single apparatus complete. Fig. 1$^a$ is an enlarged portion of Fig. 1. Fig. 2 is a back view (patient's side) of the same; Fig. 3, an edge view of the same; Fig. 4, a general view of the complete double apparatus as disposed about the patient's chair, and Fig. 5 a like view from behind the patient's chair.

This instrument consists of two sets of circular double plates, A and B, carrying any number of standard test-lenses, C and C$^2$, respectively, the series of lenses being, first, concave spherics, for the determination of the degrees of myopia; second, concave cylindrics, for the determination of the degrees of myopic astigmatism; series first and second combined, for the determination of the degrees of compound myopic astigmatism; third, convex spherics, for the determination of the degrees of hypermetropia; fourth, convex cylindrics, for the determination of the degrees of hypermetropic astigmatism; series third and fourth combined, for the determination of the degrees of compound hypermetropic astigmatism; series first and fourth combined, or series third and second combined, for the determination of the degrees of mixed astigmatism. The two plates of each set are placed one in front of the other and rotate independently on a common center or spindle, D, in a vertical plane. Both the front and back plates of each set are rotated on the spindle from the operator's side, and these two plates can be used either separately or jointly by a vacant hole (an empty hole without a glass) in each, or by any other suitable manner. The posterior plate, B, which stands nearer the eye under examination, is covered with a shield or black plate, E, Fig. 5, having a perforation, E', on either side of its horizontal border, so that only one lens of each plate can be seen through at a time, and to prevent the moisture of the breath settling on the glasses. The right eye looks through the left hole and the left eye looks through the right hole of the black plate. The disk B, immediately in front of the shield E, is mounted with spherical lenses C$^2$ of graduated powers, and rotates on the spindle D by means of any suitable mechanism, such as that shown in the drawings, and consisting (as will be seen by reference to Fig. 2) of the toothed ring B', which is secured upon or connected with the plate B. The toothed wheel B$^2$ gears with ring B', and is driven by the pinion B$^3$, firmly connected and revolving with which is the wheel B$^4$, which in its turn is driven by B$^5$, which is connected with the handle-knob B$^6$. The object of all this gearing is merely to reduce the relative amount of travel imparted to ring B' by the knob B$^6$, for the sake of steadiness and more accurate adjustment. The knob B$^6$ faces the operator, so that he can revolve the disk B as he requires. The disk can only be revolved by turning the knob B$^6$. A spring-click, F, stops the disk B as each lens C comes in succession opposite the center of the hole E', that the patient looks through. The second plate or disk, A, which superposes the last explained, is fitted with lenses C, somewhat larger, of graduated powers, that are of cylindric curvature. The axes of all of these lenses are precisely adjusted in the same direction to the center of the disk, so that when any one of them lies with its axis horizontal in front of the hole E' the others will come in succession with their axes in the same direction, and by a system of cog-wheels all the cylindric lenses are made to revolve together at the same rate, and their exact position is indicated on a large divided arc on the surface of the plate. This disk A can be rotated by hand at pleasure. This mechanism may be arranged as follows: Each lens C is held in a suitable toothed framed ring, C', which gears with the toothed ring or disk G, adapted to rotate about the general center D. With G is connected the smaller toothed ring or disk H, which is turned by the small but long pinion I, fixed upon the spindle of the knob J. When J is turned, therefore, the pinion I rotates H, which carries G round with it, and so rotates every one of the lenses C whose frames gear with it. The lenses C must therefore all rotate at the same rate, and having been originally properly adjusted they always retain their true relative positions.

The mechanism which indicates to the operator the axial position of each of the lenses C (and therefore of that particular one which is opposite the hole E' at the time the observation is made) consists of the fixed plate K, upon a portion of whose peripheral border is set out the segmental index-scale K', being the one hundred and eighty degrees or two right angles of the circle. This scale might extend farther round or entirely round; but the segment shown is sufficient. In front of this is the rotatable plate or disk L, the arrows L' upon which serve to indicate the exact position of the lenses C upon either side of the scale—that is, the amount of deviation from the horizontal line of the lenses C. The disk L is carried upon a collar, L², which also rotates about the common center D, and is toothed at L³, and gears with the toothed wheel M, which gears with the same pinion, I, which drives the disk H, so that the motion communicated to M and H is identical in all respects. The gears M and L³ are proportioned according to the divisions of the scale K' and the diameter of the plate L, so that the arrows L' truly represent upon the scale the axial position of the lenses C. The inclination or direction of the refractive axis of each lens of the cylindric series is adjusted to correspond with the degree or angle indicated on the index-scale K' by the indices L' on the movable plate L. The latter traveling at a slower rate than the lenses, an extended or magnified reading is thus obtained for the sake of legibility. The denomination or dioptric value of each lens is also figured on each disk, the figuring on the posterior plates showing through the lenses of the front plates. When the vacant holes of each disk are brought to the perforation in the shields E, through which the patient looks, the instrument is at zero.

The mode of suspension of the two sets of plates can be adapted to suit the wants of the operator, and forms no part of the invention. A convenient way of doing this, however, is shown in Figs. 4 (view from the operator's side) and 5, (view from behind the patient's chair.) N is a stout wooden pillar working up and down in the tube N' by means of a rack and spiral pinion operated by the crank-handle N². O O are two curved arms projecting out from the pillar N, to the extremities of which are secured two brass tubes, P. These tubes have each inside of their whole length a screw, on which works a nut that is firmly secured to the top end of the rods or tubes Q, which carry the lens, disks, &c., each nut being let through to inside of the tubes P by a slit, which is made in the under side of each. The handle P' can be fitted on the end of either screw, and by turning the said handle P' one or other of the disks can be made to travel to and fro right across the bars. The tube N' is secured to the back of a heavy arm-chair, and when not in use the pillar N is raised. After the ophthalmoscopic or optometric examination of the patient, he sits in the arm-chair, and the pillar N is lowered by crank N² to bring the apertures E' to the level of his eye. Then handle P' can be made to cause the set required to travel to meet the patient's eye, who looks with his right eye through the left edge of the disk E, and vice versa. One of the double sets of plates carries in its posterior or back plate (patient's side) concave spheric lenses for the determination of the degree of myopia, and the front plate carries concave cylindric lenses, arranged as previously described, for the determination of the degree of myopic astigmatism. The spheric lenses in the posterior plate can be seen through by themselves when the vacant hole in the front plate that carries the cylindric lenses is placed in front of the aperture E', through which the patient looks. Similarly the cylindric lenses of the front plate can be seen through by themselves by bringing the vacant hole in the back plate that carries the spheric lenses in front of the aperture E', that is being looked through, or by any other suitable motion that would leave the lenses of only one of the plates in a position to be looked through at a time; and, lastly, the two plates can be used jointly for the determination of the degree of myopia combined with myopic astigmatism. The other set of double plates carries the convex lenses and works in exactly the same way for the determination of the degree of hypermetropia, hypermetropic astigmatism, and the combination of the two.

The front plates of both double sets carrying the cylindric lenses can be removed and changed from their spherics for the determination of mixed astigmatism, for which purpose the plate mounted with the convex cylindric lenses will be placed in front of the concave spherics.

The arrows serve to show the direction of the movements of the various parts when the knob J is turned in one direction. If the movement of the knob be reversed, the other movements will be also reversed.

The instrument may also have a fifth plate, exactly similar to the interchangeable plates A, Fig. 1, but mounted with prismatic lenses, for the determination of the refractive displacement required to assist muscular asthenopia and strabismus.

I claim—

1. In an instrument for determining the degree of refractive error of the eye, the combination of two disks rotatable about a common center, the one carrying a series of spherical lenses fixed within its peripheral margin, and the other a series of cylindric lenses similarly located, but adapted to revolve each upon its own axis, substantially as specified.

2. In an instrument for determining the degree of refractive error of the eye, the combination, with a disk, A, adapted to be revolved upon its center, of a series of cylindric lenses carried in toothed frames or rings, the whole of which gear with a toothed ring or plate in such manner that as the said toothed ring or plate is rotated each of said lenses is revolved about its own axis at the same rate as all the rest, substantially in the manner and for the purpose specified.

3. In an instrument for determining the degree of refractive error of the eye, the combination, with a series of cylindric lenses, C, each carried in a frame or ring, C', of a central plate, G, gearing with the whole of said rings C', and carrying a toothed ring or plate, H, adapted to be turned by a pinion, I, the whole constructed and operating substantially in the manner and for the purpose specified.

4. In an instrument for determining the degree of refractive error of the eye, the combination, with a series of cylindric lenses adapted to be rotated simultaneously about their own centers, of an indicating mechanism consisting of a fixed graduated plate and a movable index disk or plate operated by the same gearing which rotates the lenses, substantially as specified.

5. In an instrument for determining the degree of refractive error of the eye, and as a means of operating a series of cylindric lenses carried in toothed rings in a plate or disk adapted to be rotated about its own center, the combination, with said toothed rings, of a central rotatable toothed ring or disk, a second smaller toothed ring or disk firmly secured to the first disk, and an actuating-pinion, the whole constructed and operating substantially in the manner and for the purpose specified.

6. In an instrument for determining the degree of refractive error of the eye, and as a means of simultaneously rotating a series of cylindric lenses about their own centers, and at the same time indicating the amount of such movement, the combination, with an actuating-pinion, I, toothed plates or rings H and G, and toothed frames C', which contain the lenses, of a toothed wheel, M, gearing with pinion I, a toothed collar, $L^2 L^3$, an index-plate, L, secured upon said collar and movable with it, and a fixed graduated scale-plate, K K', the whole constructed and operating substantially as specified.

In testimony whereof I have hereto set my hand in the presence of the two subscribing witnesses.

ARISTIDE MARIE ANTOINE FOURNET.

Witnesses:
ALFRED J. BOULT,
HAROLD WADE.